United States Patent
Inaba

(10) Patent No.: US 11,585,306 B2
(45) Date of Patent: Feb. 21, 2023

(54) INJECTION CONTROL DEVICE

(71) Applicant: DENSO CORPORATION, Kariya (JP)

(72) Inventor: Masashi Inaba, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/540,755

(22) Filed: Dec. 2, 2021

(65) Prior Publication Data

US 2022/0186699 A1 Jun. 16, 2022

(30) Foreign Application Priority Data

Dec. 14, 2020 (JP) .............................. JP2020-206914

(51) Int. Cl.
- *F02M 65/00* (2006.01)
- *F02M 51/06* (2006.01)
- *F02M 61/10* (2006.01)

(52) U.S. Cl.
CPC ........ *F02M 65/005* (2013.01); *F02M 51/061* (2013.01); *F02M 61/10* (2013.01); *F02M 2200/245* (2013.01)

(58) Field of Classification Search
CPC .... F02D 41/00; F02D 41/0085; F02D 41/042; F02D 2041/2003; F02D 2041/2037; F02D 2041/2055; F02D 2041/2058; F02D 2200/063; F02M 51/06; F02M 51/061; F02M 51/0685; F02M 61/10; F02M 65/00; F02M 65/005; F02M 2200/245
See application file for complete search history.

(56) References Cited

U.S. PATENT DOCUMENTS

| 2015/0108238 A1* | 4/2015 | Grandi | F02D 41/2467 239/71 |
| 2015/0152824 A1* | 6/2015 | Akazaki | F02M 51/0671 239/71 |
| 2016/0177855 A1* | 6/2016 | Kusakabe | F02M 51/0685 123/490 |

FOREIGN PATENT DOCUMENTS

| JP | 2003-065178 A | 3/2003 |
| JP | 2017-075542 A | 4/2017 |

* cited by examiner

*Primary Examiner* — John Kwon
*Assistant Examiner* — Johnny H Hoang
(74) *Attorney, Agent, or Firm* — Posz Law Group, PLC

(57) ABSTRACT

An injection control device includes an injector and a detection unit. The injector includes: an injection hole; a movable part; a seat portion; a valve housing; a magnetic field application unit; and a detection sensor. The movable part opens and closes the injection hole by reciprocal movement. The seat portion when seated by the movable part closes the injection hole, and when the movable part lifted therefrom opens the injection hole. The valve housing accommodates the movable part in a reciprocally movable manner. The magnetic field application unit is installed on an outer circumference of the valve housing and applies a magnetic field to the movable part and the valve housing. The detection sensor outputs a detection signal according to a size of a distance between the valve housing and the movable part.

31 Claims, 13 Drawing Sheets

INJECTION CONTROL DEVICE

CROSS REFERENCE TO RELATED APPLICATION

The present application is based on and claims the benefit of priority of Japanese Patent Application No. 2020-206914, filed on Dec. 14, 2020, the disclosure of which is incorporated herein by reference.

TECHNICAL FIELD

The present disclosure generally relates to a technique for detecting a position of a movable part that opens and closes an injection hole of an injector by reciprocating when a valve is closed.

BACKGROUND INFORMATION

A conventional technique can detect a valve closed timing of when a movable part reaches a lower stopper, but cannot detect a position of the movable part at the valve closed timing.

SUMMARY

It is an object of the present disclosure to provide a technique for detecting a position of a movable part of an injector in a reciprocal movement direction at valve closed timing.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described with reference to the drawings.

1. First Embodiment

[1-1. Configuration]

Figure 1:
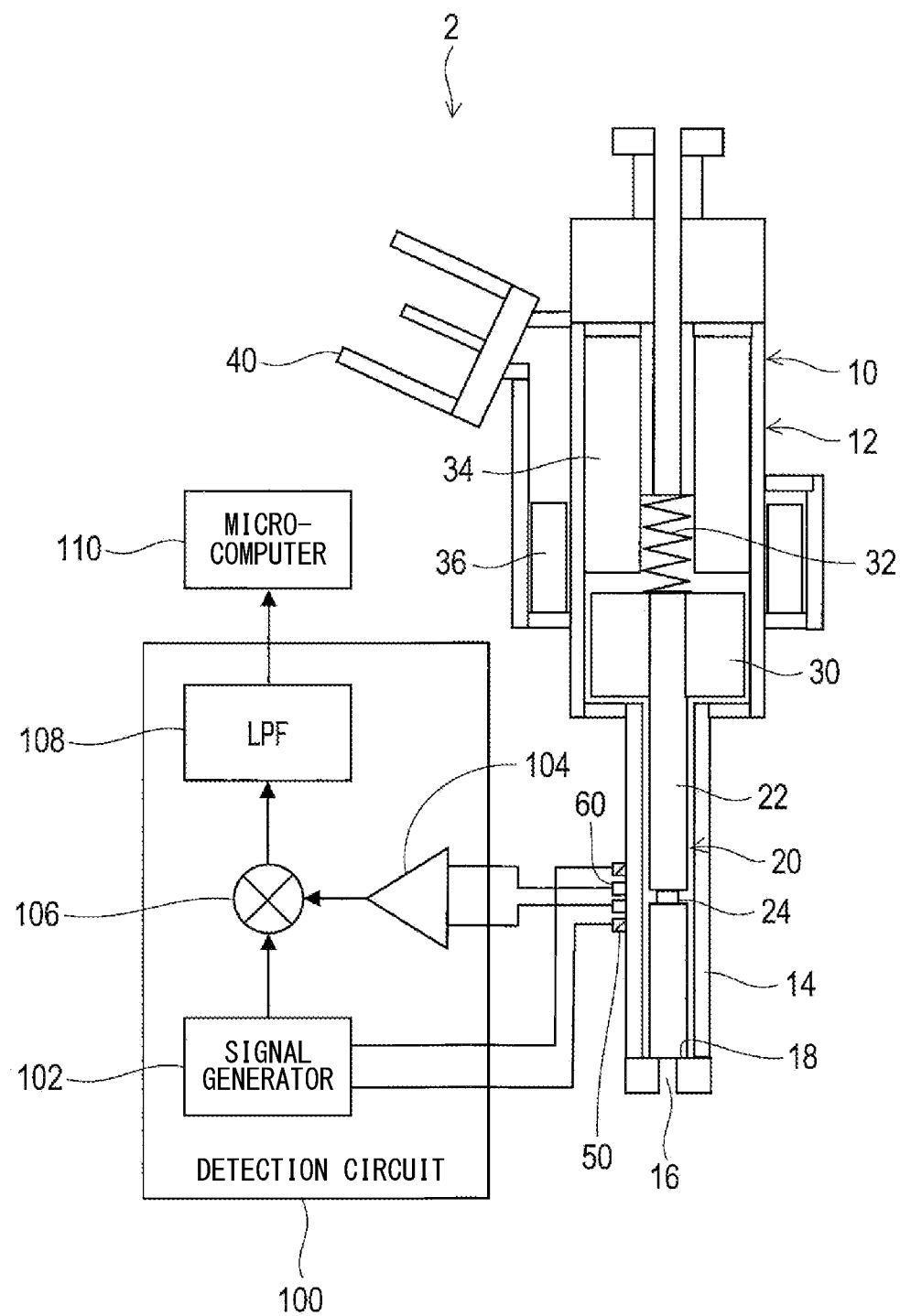
FIG. 1 is a configuration diagram showing an injection control device according to a first embodiment.

An injection control device 2 shown in FIG. 1 includes an injector 10, a detection circuit 100, and a microcomputer 110.

The injector 10 includes a valve housing 12, an injection hole 16, a seat portion 18, a movable part 20, a spring 32, a fixed core 34, a drive coil 36, a connector 40, an application coil 50, and a detection coil 60. The injector 10 injects a gaseous fuel such as hydrogen, for example. Liquids such as gasoline may also be injected.

The valve housing 12 houses the movable part 20, the spring 32, and the fixed core 34. A cylinder portion 14 of the valve housing 12 surrounds a needle 22 of the movable part 20 to be reciprocally movable. The injection hole 16 is formed at a tip of the cylinder portion 14. The seat portion 18 on which the needle 22 is seated is formed on an inner circumferential surface around the injection hole 16 of the cylinder portion 14.

The movable part 20 includes the needle 22 and a movable core 30. The needle 22 and the movable core 30 may be integrally provided or may be separately provided. In the movable part 20 shown in FIG. 1, the needle 22 and the movable core 30 are integrally formed, and the needle 22 and the movable core 30 move back and forth integrally.

When the needle 22 is seated on the seat portion 18, the injection hole 16 is closed and the fuel injection from the injection hole 16 is cut off. When the needle 22 lifts from the seat portion 18, the injection hole 16 is opened, and fuel is injected from the injection hole 16. In the middle of the needle 22 in an axial direction, a slit 24 having a quadrangular cross section (a U-shaped trench) recessed inward in a radial direction is formed on an entire circumference of an outer peripheral surface of the needle 22.

With such configuration, a distance between a bottom of the slit 24 and the inner circumferential surface of the cylinder portion 14, that is, a magnetic gap, is greater than a magnetic gap between an outer peripheral surface of the needle 22 other than the slit 24 and the inner circumferential surface of the cylinder portion 14. As a result, a magnetic permeability between a portion where the slit 24 of the needle 22 is formed and the cylinder portion 14 is smaller than a magnetic permeability between a portion where the slit 24 of the needle 22 is not formed and the cylinder portion 14.

The spring 32 is installed on one side (an upper side, arbitrarily defined by the orientation of FIG. 1) opposite to the seat portion 18 of the needle 22, and applies a load to the needle 22 toward the seat portion 18. The fixed core 34 is installed above to the movable core 30, and forms a magnetic gap with the movable core 30.

The drive coil 36 generates a magnetic flux when a drive signal for driving the movable part 20 in a reciprocal movement direction (upwardly) is supplied from the connector 40. The magnetic flux generated by the drive coil 36 flows between the movable core 30 and the fixed core 34, and a magnetic attraction force is generated between the movable core 30 and the fixed core 34.

When a magnetic attraction force is generated between the movable core 30 and the fixed core 34 and the movable core 30 is attracted to a fixed core 34 side against the load of the spring 32, the needle 22 lifts from the seat portion 18. When the needle 22 lifts from the seat portion 18, fuel is injected from the injection hole 16.

When the energization of the drive coil 36 is cut off while the needle 22 is lifted from the seat portion 18, the needle 22 moves toward the seat portion 18 due to the load applied from the spring 32, and possibly due to other forces such as gravity. Then, when the needle 22 is seated on the seat portion 18, the fuel injection from the injection hole 16 is cut off.

The application coil 50 and the detection coil 60 are coaxially installed on the outer circumference of the cylinder portion 14 so that the application coil 50 is on an outer peripheral side of the detection coil 60. The detection circuit 100 includes a signal generator 102, an amplifier 104, a mixer 106, and an LPF 108. LPF is an abbreviation for Low Pass Filter. Lock-in detection is performed by the signal generator 102, the amplifier 104, the mixer 106, and the LPF 108.

The signal generator 102 applies a low-frequency application voltage to the application coil 50. The application voltage applied to the application coil 50 is also applied to the mixer 106 at a same frequency as a reference signal. When a low-frequency application voltage is applied from the signal generator 102 to the application coil 50, the magnetic flux generated by the application coil 50 flows between the cylinder portion 14 and the needle 22. Then, an alternating magnetic field having the same frequency as the application voltage applied to the application coil 50 is applied to the cylinder portion 14 and the needle 22.

When the magnetic flux generated by the application coil 50 flows between the cylinder portion 14 and the needle 22, depending on the size of the magnetic gap between the needle 22 and the cylinder portion 14 at the position where the detection coil 60 is installed, an induced electromotive force (specifically, an induced voltage) having the same frequency as the application voltage is generated in the detection coil 60. The magnitude of the induced voltage generated in the detection coil 60 is great when the magnetic gap between the needle 22 and the cylinder portion 14 is small (in areas away from the slit 24), and the magnitude of the induced voltage is large when the magnetic gap between the needle 22 and the cylinder portion 14 is large (in areas near the slit 24).

The detection coil 60 outputs an induced voltage generated according to the size of the magnetic gap between the needle 22 and the cylinder portion 14 to the amplifier 104 as a detection signal. The amplifier 104 amplifies the induced voltage output from the detection coil 60 and outputs it to the mixer 106.

The mixer 106 multiplies the application voltage applied to the application coil 50 from the signal generator 102 by the induced voltage generated in the detection coil 60, and outputs the result to the LPF 108. The LPF 108 removes an AC component from the output of the mixer 106 and outputs a DC component as a detection voltage.

The microcomputer 110 detects the position of the needle 22 in a reciprocal movement direction at valve closed timing, based on the detection voltage output from the detection circuit 100.

[1-2. Processing]

Figure 2:
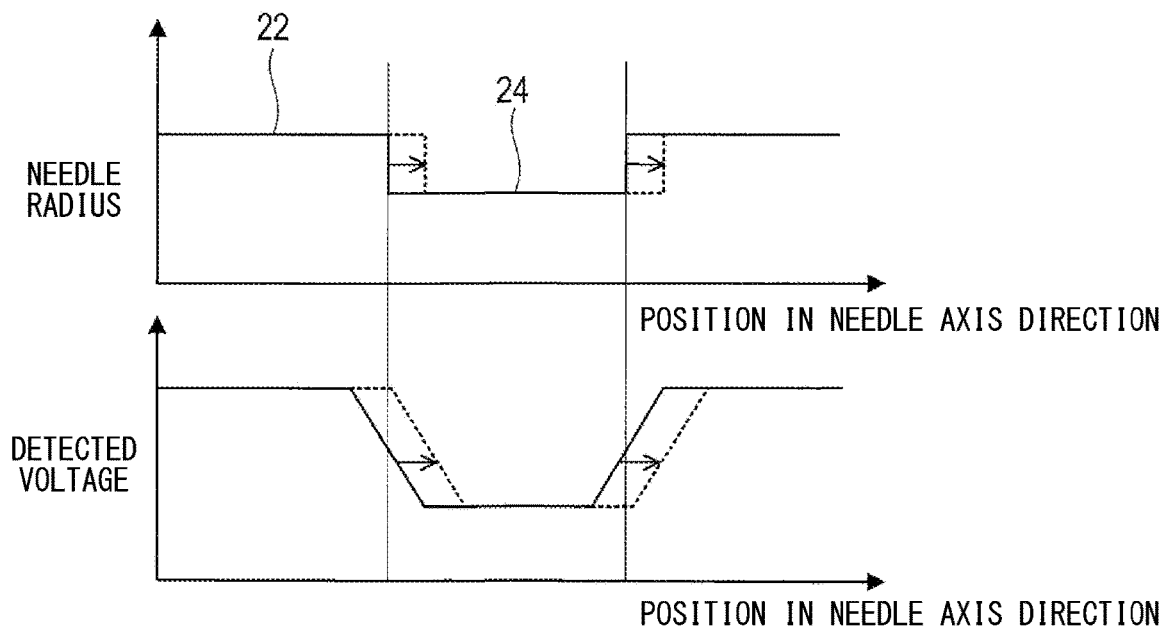
FIG. 2 is an explanatory diagram showing a relationship between a shape of a needle and a detection voltage.

As shown in FIG. 2, the radius of the needle 22 is different between a portion where the slit 24 is formed and a portion where the slit 24 is not formed. As a result, the magnetic permeability between the needle 22 and the cylinder portion 14 changes according to the size of the magnetic gap between the needle 22 and the cylinder portion 14.

When the application voltage is applied to the application coil 50, the detection voltage is output from the detection circuit 100 by the induced voltage generated in the detection coil 60 according to the change in the magnetic permeability, that is, a gradient of the strength of the magnetic field.

The magnetic permeability between the portion of the needle 22 where the slit 24 is formed and the cylinder portion 14 is smaller than the magnetic permeability between the portion of the needle 22 where the slit 24 is not formed and the cylinder portion 14. Therefore, the detection voltage detected between the portion where the slit 24 of the needle 22 is formed and the cylinder portion 14 is lower than the detection voltage detected between the portion where the slit 24 of the needle 22 is not formed and the cylinder portion 14. In other words, a typical needle material, such as iron, has a high magnetic permeability, and will assist the application coil 50 to induce a high voltage in the detection coil 60. In FIG. 2, a liquid with low magnetic permeability (such as gasoline) fills the slit 24, and thus the detection coil 60 detects a (relatively) low induced voltage when the slit 24 is nearby. Alternatively, the needle may include a relatively low magnetic permeability material (such as plastic) to cause a low induced voltage when located near the detection coil 60, especially when located between the application coil 50 and the detection coil 60.

When the needle 22 is repeatedly seated on the seat portion 18, the contact part between the needle 22 and the seat portion 18 is worn. As a result, when the injector 10 is closed (i.e., at valve closed timing), the position of the needle 22 in the reciprocal movement direction moves, i.e., changes, toward a seat portion 18 side as shown from the left to the right in FIG. 2 (downwardly in FIG. 1).

If the position of the needle 22 in the reciprocal movement direction changes at valve closed timing, the injector 10 may inject a different injection amount of fuel at different timings with respect to a drive signal supplied to the drive coil 36 to control fuel injection. In such case, the injection amount of the injector 10 cannot be controlled with high accuracy.

Further, the wear of the contact part between the needle 22 and the seat portion 18 causes the position of the needle 22 to change when the injector 10 is closed, which means that the contact part between the needle 22 and the seat portion 18 might be deformed. In such case, it may be possible that the sealability of the contact part between the needle 22 and the seat portion 18 at valve closed timing is not maintained. Additionally, in a worn injector, an initial gap between the fixed core 34 and the movable core 30 increases when the valve is closed, and this may affect performance when a driving voltage is applied to the drive coil 36.

Here, when the position of the needle 22 in the reciprocal movement direction changes at valve closed timing and the slit 24 comes closer to or goes away from the position where the detection coil 60 is installed, the magnetic permeability between the cylinder portion 14 and the cylinder portion 14 changes at the position where the detection coil 60 is installed. When the magnetic permeability between the needle 22 and the cylinder portion 14 changes, the detection voltage also changes. Specifically, magnetic permeability between the application coil 50 and the detection coil 60 changes, and thus an induced voltage in the detection coil 60 changes.

Figure 3:
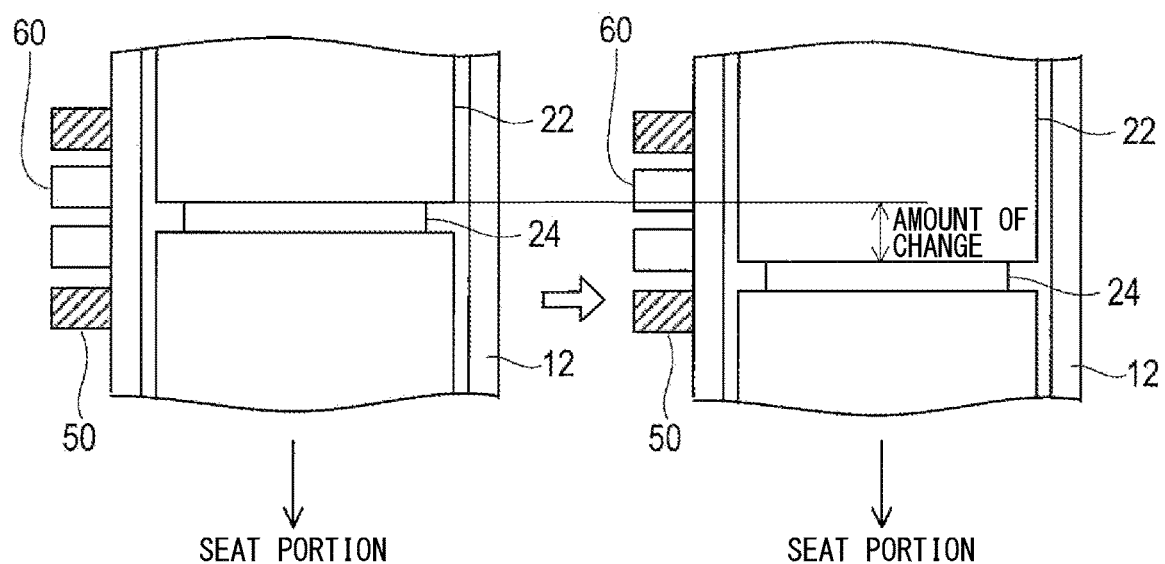
FIG. 3 is a schematic view showing a change of a position of the needle of an injector.

The detection voltage (induced voltage) increases when the position of the slit 24 at valve closed timing in the reciprocal movement direction moves away from the position facing the detection coil 60 toward the seat portion 18 (right side of FIG. 3). The detection voltage decreases when the position of the slit 24 at valve closed timing in the reciprocal movement direction approaches the position facing the detection coil 60 toward the seat portion 18 (left side of FIG. 3).

The microcomputer 110 stores, or memorizes, an initial position of the slit 24 with respect to the detection coil 60 at valve closed timing in the reciprocal movement direction, before the contact part between the needle 22 and the seat portion 18 is worn. Then, the microcomputer 110 stores a value of the detection voltage when the slit 24 is in the initial position.

The microcomputer 110 can detect, by detecting a decreasing or increasing change of the detection voltage, that the position of the slit 24 at valve closed timing, that is, the position of the needle 22 at valve closed timing, has changed by a predetermined amount from the initial position due to wear of the contact part between the needle 22 and the seat portion 18.

Therefore, by applying a low-frequency application voltage to the application coil 50 and detecting the detection voltage from the induced voltage generated in the detection coil 60 as a detection signal, an amount of change of the position (vertical change in FIGS. 1 and 3) of the needle 22 at valve closed timing can be detected.

Figure 4:
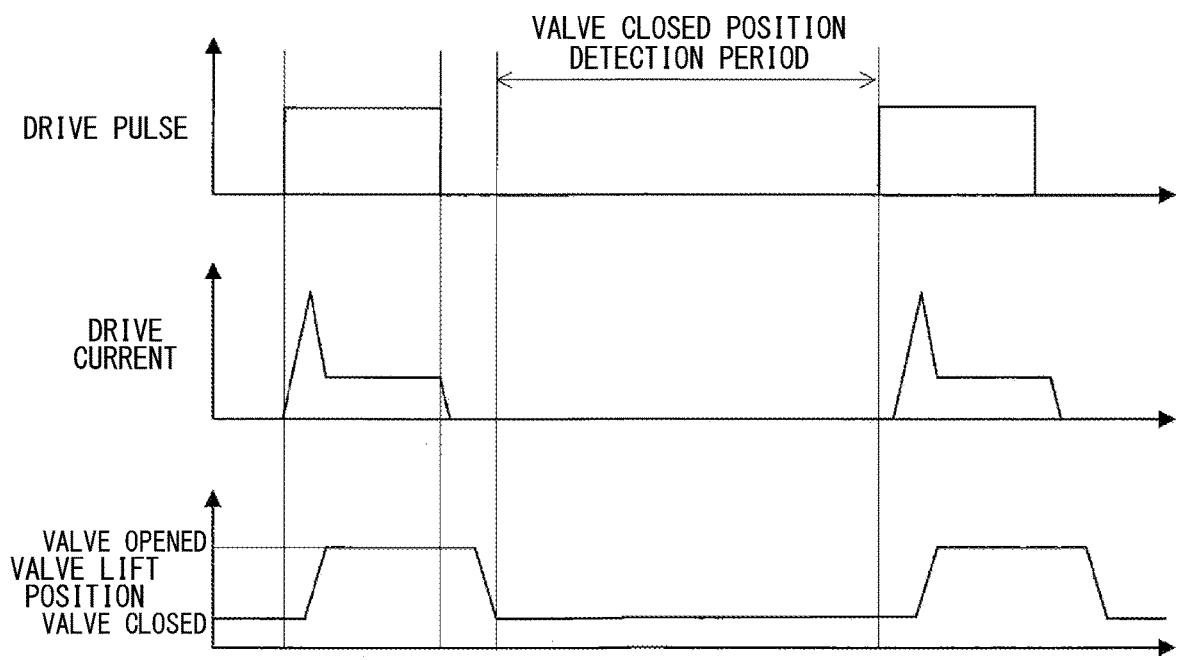
FIG. 4 is a time chart showing execution timing of a position detection process.

Note that, as shown in FIG. 4, the microcomputer 110 performs a position detection process for detecting the amount of change of the position of the needle 22 at valve closed timing by applying a low-frequency application voltage to the application coil 50 during a period in which injection is not instructed to the injector 10.

For example, the position detection process may be executed once or a plurality of times during a period between a start of the engine and a stop of the engine. In FIG. 4, the position detection process may be performed between the injection periods. In addition to the above timing, the position detection process may be performed before a first fuel injection from the injector 10 prior to starting the engine, or after the last fuel injection from the injector 10 when the engine is stopped.

The position detection process may also be performed according to the temperature of the engine in consideration of the thermal expansion of the members constituting the injector 10, the viscosity of the fuel, and the like. Further, when the position detection process is performed a plurality of times between the start of the engine and the stop of the engine, for example, the average amount of changes in the position of the needle 22 at valve closed timing is calculated.

When the amount of change of the position of the needle 22 at valve closed timing has changed by a predetermined amount or more, the microcomputer 110 notifies that the injector 10 should be replaced. Further, the microcomputer 110 adjusts an injection control process according to the amount of change of the position of the needle 22 before and/or after notifying the replacement of the injector 10.

Specifically, as the injection control process, injection parameters may be adjusted as described in the following (a1) to (a3).

(a1) An injection start timing instructed to the injector 10 is advanced.

(a2) In a partial lift, the injection period instructed to the injector 10 is lengthened/extended, and in a full lift, the injection period instructed to the injector 10 is shortened.

(a3) Fuel pressure for supplying fuel to the injector 10 is increased.

In the first embodiment described above, the slit 24 corresponds to a position indicator, the application coil 50 corresponds to a magnetic field application unit, the detection coil 60 corresponds to a detection sensor, and the detection circuit 100 and the microcomputer 110 correspond to a detection unit.

[1-3. Effects]

The first embodiment described above achieves the following effects.

(1a) In the injection control device that cannot detect the amount of change of the position of the needle at valve closed timing in the reciprocal movement direction, in consideration that the amount of change of the position of the needle in the reciprocal movement direction varies injector to injector, replacement of the injector may be notified prematurely. As a result, injectors that do not need to be replaced may be replaced.

On the other hand, in the above-described first embodiment, the amount of change of the position of the needle 22 at valve closed timing in the reciprocal movement direction is detectable with high accuracy. Therefore, at an appropriate timing when the amount of change of the position of the needle 22 at valve closed timing in the reciprocal movement direction is determined as not capable of maintaining the sealability at valve closed timing due to the deformation of the contact part between the needle 22 and the seat portion 18, the replacement of the injector 10 is notified.

The timing for notifying the replacement is set earlier than it is determined that the sealability of the injector 10 at valve closed timing is not maintainable, in consideration of the time required for the user to replace the injector 10 at a dealer or the like.

(1b) In order to delay the replacement timing of the injector due to wear of the contact part between the needle 22 and the seat portion 18, surface treatment of the contact part may be performed, or the needle 22 and the seat portion 18 may be formed of a high hardness material. In such case, the manufacturing cost of the injector 10 increases.

On the other hand, in the above-described first embodiment, without surface treatment of the contact part between the needle 22 and the sheet portion 18, or without making the needle 22 and the sheet portion 18 of a high-hardness material, the replacement of the injector 10 can be notified at an appropriate timing. Therefore, the injector 10 can be manufactured at low cost.

(1c) The amount of change of the position of the needle 22 at valve closed timing in the reciprocal movement direction is detectable with high accuracy. In such manner, the injection of the injector 10 can be controlled with high accuracy based on the amount of change of the position of the needle 22 in the reciprocal movement direction until the injector 10 is replaced because the sealability at valve closed timing cannot be maintained.

2. Second to Tenth Embodiments

The second to tenth embodiments shown in FIGS. 5 to 9 are either having a different needle shape than the needle 22 of the first embodiment or having a different shape of the cylinder portion 14. Further, in the seventh to the tenth embodiments, the installation position of the application coil 50 and the detection coil 60 of the first embodiment is different therein, or the difference of the installation position of the application coil 50 and the detection coil 60 is combined with the difference of the needle shape described above, which are shown in FIGS. 10 to 13.

In the second to tenth embodiments, the same reference numerals as those in the first embodiment indicate the same configuration, and the preceding description will be referred to. In the second to tenth embodiments, the same effects as those of the first embodiment described above as (1a) to (1c) are obtainable.

Figure 5:
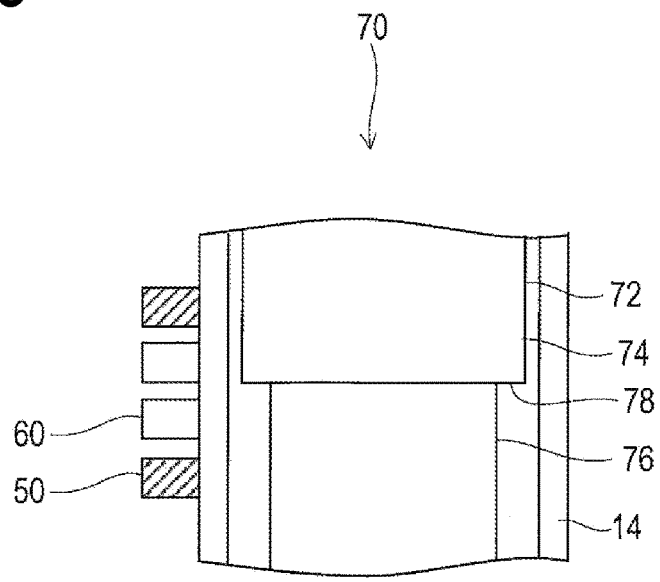
FIG. 5 is a schematic view showing the injector of a second embodiment.

Second Embodiment, FIG. 5, step 78

A needle 72 of an injector 70 of the second embodiment shown in FIG. 5 includes a large radius portion 74 and a small radius portion 76. The microcomputer 110 stores the initial position of a step 78, which is a boundary between the large radius portion 74 and the small radius portion 76. Then, when the microcomputer 110 detects the change in the detection voltage corresponding to the shape of the step 78, the microcomputer 110 determines that the position of the needle 72 at valve closed timing in the reciprocal movement direction has moved by a predetermined amount.

In the second embodiment, the step 78 corresponds to a position indicator.

Figure 6:
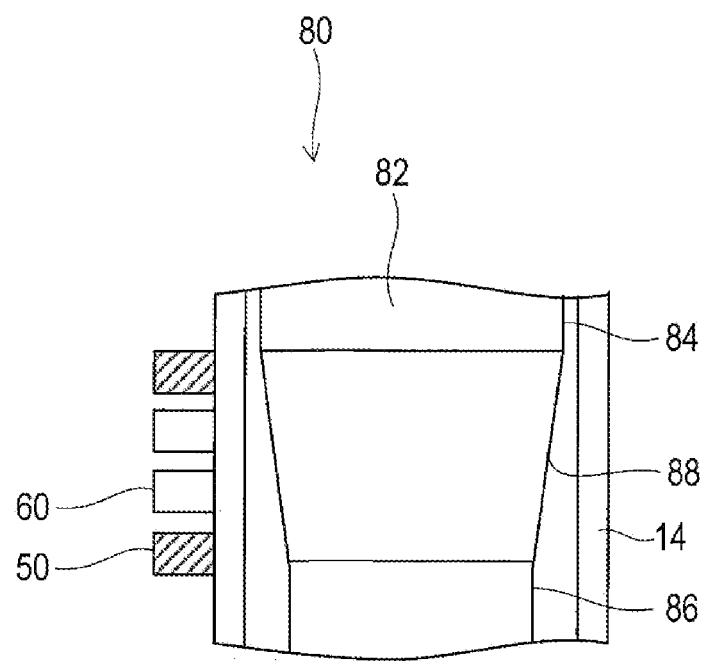
FIG. 6 is a schematic view showing the injector according to a third embodiment.

Third Embodiment, FIG. 6, Tapered Portion 88

A needle 82 of an injector 80 shown in FIG. 6 includes a large radius portion 84 and a small radius portion 86. A tapered portion 88 is formed in which the radius is gradually reduced from the large radius portion 84 to the small radius portion 86. The microcomputer 110 stores the initial position of the tapered portion 88.

In the third embodiment, the tapered portion 88 corresponds to a position indicator.

(Effects)

Further, in the third embodiment, the following effects are obtainable.

Since the change in the detection voltage corresponds to the change in the radius of the needle 82 in the tapered portion 88, the microcomputer 110 can detect with high accuracy that the position of the needle 82 has changed (from the initial position) due to the change in the detection voltage.

Figure 7:
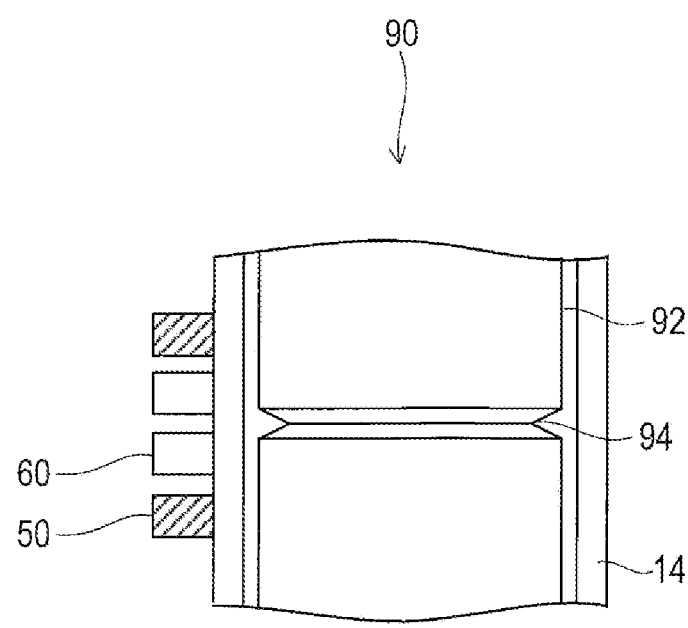
FIG. 7 is a schematic view showing the injector according to a fourth embodiment.

Fourth Embodiment, FIG. 7, V-Shaped Slit

A needle 92 of an injector 90 of the fourth embodiment shown in FIG. 7 is provided with a slit 94 recessed in a V-shaped cross section at a position facing the detection coil 60 in the radial direction. The microcomputer 110 stores the initial position of the slit 94.

When the position of the slit 94 facing the detection coil 60 changes due to the change of the position of the needle 92 at valve closed timing in the reciprocal movement direction, the detection voltage detected by the microcomputer 110 has a "minimum" at which the decrease of detection voltage turns to increase. When the microcomputer 110 detects the "minimum" at which decrease of the detection voltage turns to increase, the microcomputer 110 determines that the position of the needle 92 at valve closed timing in the reciprocal movement direction has moved by a predetermined amount.

In the fourth embodiment, the V-shaped slit 94 corresponds to a position indicator.

(Effects)

Further, in the fourth embodiment, the following effects are obtainable.

By detecting the peak at which decrease of the detection voltage turns to increase, the amount of change of the position of the needle 92 at valve closed timing in the reciprocal movement direction is detectable with high accuracy.

Figure 8:
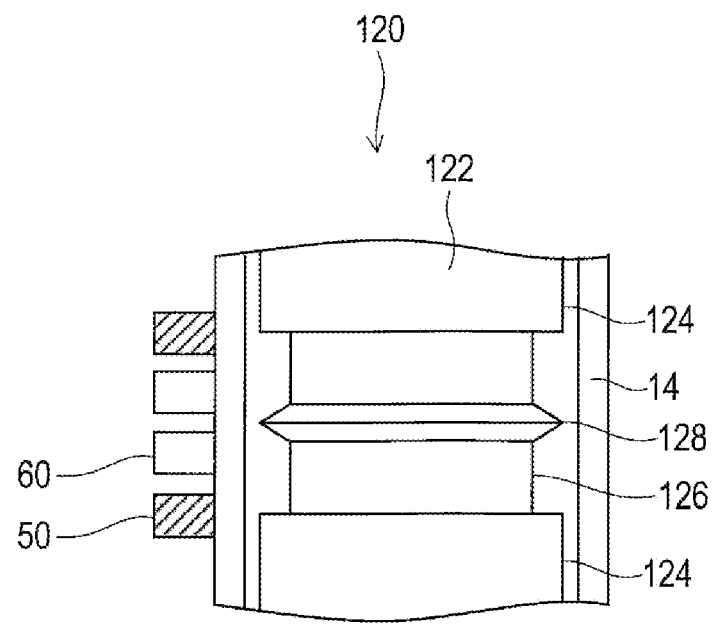
FIG. 8 is a schematic view showing the injector according to a fifth embodiment.

Fifth Embodiment, FIG. 8, Outward Protrusion 128

A needle 122 of an injector 120 of the fifth embodiment shown in FIG. 8 includes a large radius portion 124 and a small radius portion 126. A protrusion (an outward protrusion) 128 having a V-shaped cross section is formed in the small radius portion 126 at a position facing the detection coil 60 in the radial direction. The microcomputer 110 stores the initial position of the protrusion 128.

When the position of the outward protrusion 128 facing the detection coil 60 changes due to the change of the position of the needle 122 at valve closed timing in the reciprocal movement direction, the detection voltage detected by the microcomputer 110 has a peak at which increase of the voltage increases turns to decrease thereof. When the microcomputer 110 detects a peak at which increase of the detection voltage turns to decrease, the microcomputer 110 determines that the position of the needle 122 at valve closed timing in the reciprocal movement direction has moved by a predetermined amount.

In the fifth embodiment, the outward protrusion 128 corresponds to a position indicator.

(Effects)

Further, in the fifth embodiment, the following effects are obtainable.

By detecting a peak at which increase of the detection voltage turns to decrease, the amount of change of the position of the needle 92 at valve closed timing in the reciprocal movement direction is detectable with high accuracy.

Figure 9:
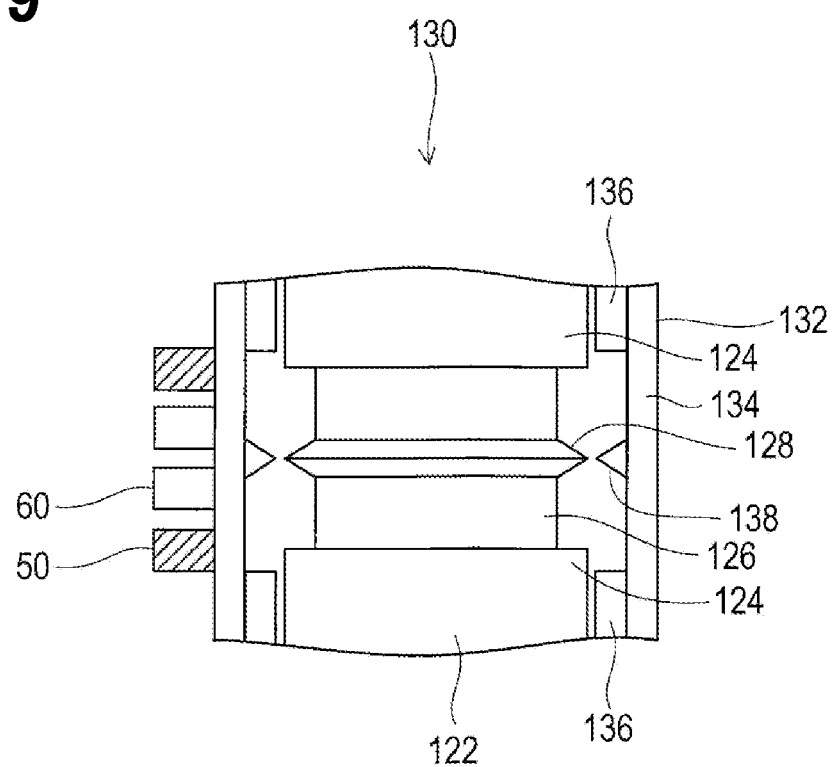
FIG. 9 is a schematic view showing the injector according to a sixth embodiment.

Sixth Embodiment, FIG. 9, Inward Protrusion 138

The needle 122 of an injector 130 of the sixth embodiment shown in FIG. 9 is substantially the same as the needle 122 of the fifth embodiment shown in FIG. 8. The microcomputer 110 stores the initial position of the outward protrusion 128 of the needle 122.

A cylinder portion 132 of the injector 130 includes an outer cylinder 134, an inner cylinder 136, and a protrusion (an inward protrusion) 138. The inward protrusion 138 is formed to inwardly protrude from an inner surface of the outer cylinder 134 in a V-shaped cross section. The inner cylinders 136 are installed on an inner surface side of the outer cylinder 134 with the protrusion 138 interposed therebetween.

When the position of the outward protrusion 128 facing the detection coil 60 changes due to the change of the position of the needle 122 at valve closed timing in the reciprocal movement direction, the detection voltage detected by the microcomputer 110 has a peak at which increase of the voltage turns to decrease. When the microcomputer 110 detects a peak at which increase of the detection voltage turns to decrease, the microcomputer 110 determines that the position of the needle 122 at valve closed timing in the reciprocal movement direction has moved by a predetermined amount.

(Effects)

In the sixth embodiment, the same effect as in the fifth embodiment is obtainable.

Figure 10:
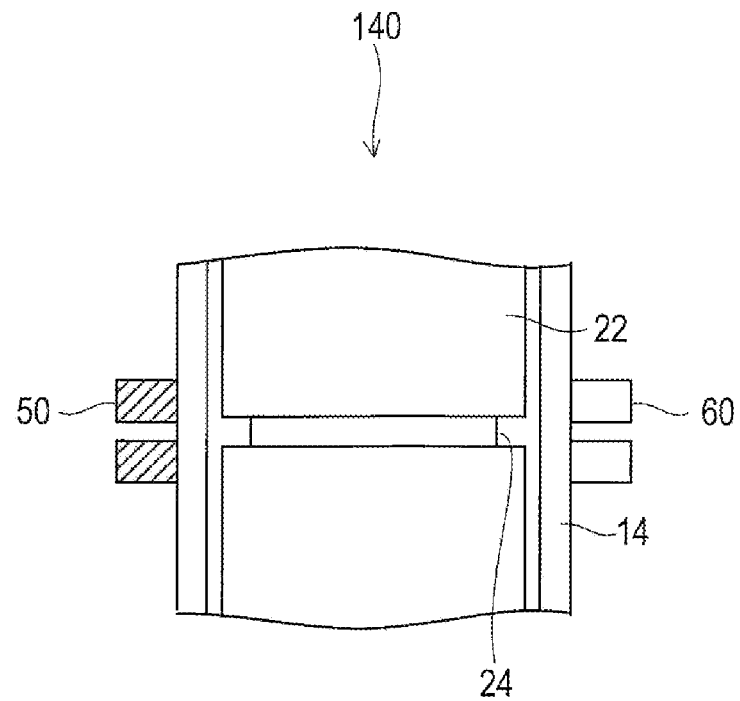
FIG. 10 is a schematic view showing the injector according to a seventh embodiment.

Seventh Embodiment, FIG. 10, Detection Coil 60 Opposite to Application Coil 50

In an injector 140 of the seventh embodiment shown in FIG. 10, the application coil 50 is installed on the outer circumference on one side (e.g., a left side) in the radial direction of the cylinder portion 14, and the detection coil 60 is installed on the outer circumference on the other side (e.g., a right side) in the radial direction.

Eighth Embodiment, FIG. 11, Detection Coil 60 Above or Below the Application Coil 50

Figure 11:
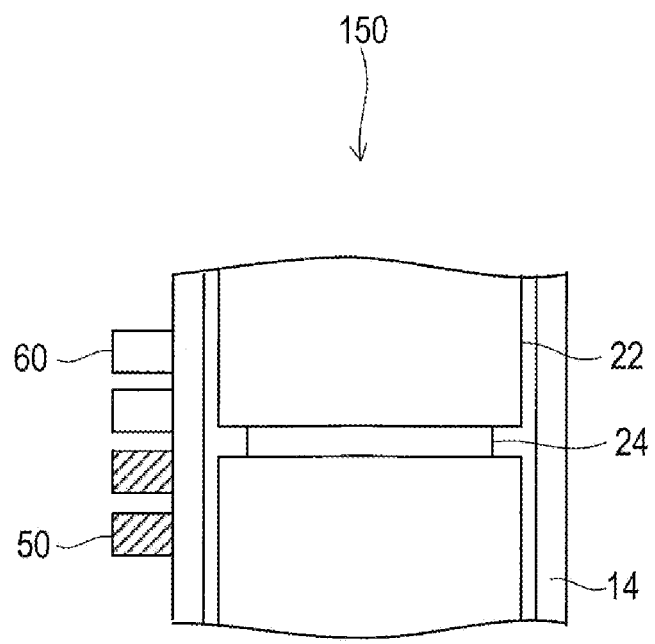
FIG. 11 is a schematic view showing the injector according to an eighth embodiment.

In an injector 150 of the eighth embodiment shown in FIG. 11, the application coil 50 and the detection coil 60 are installed side by side at different positions in the reciprocal movement direction of the needle 22 on the outer circumference of the cylinder portion 14.

Figure 12:
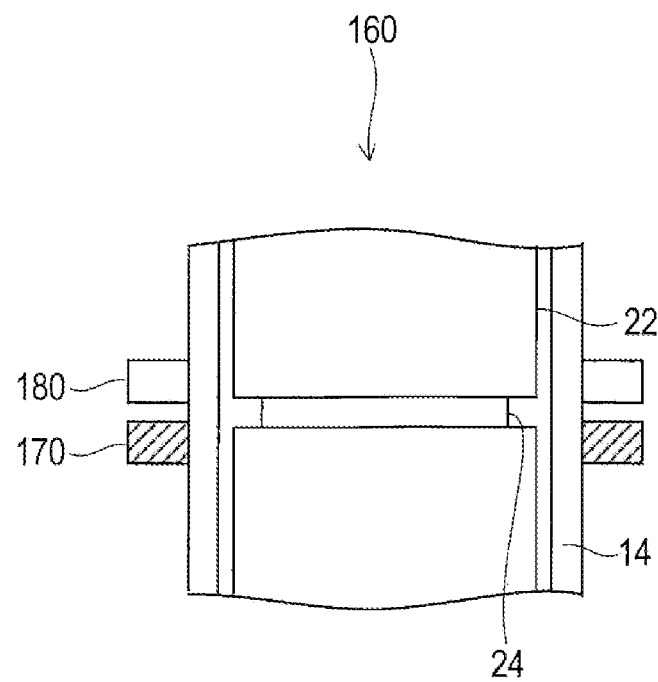
FIG. 12 is a schematic view showing the injector according to a ninth embodiment.

Ninth Embodiment, FIG. 12

In an injector 160 of the ninth embodiment shown in FIG. 12, an application coil 170 and a detection coil 180 are wound around the outer circumference of the cylinder portion 14.

In the ninth embodiment, the application coil 170 corresponds to a magnetic field application unit, and the detection coil 180 corresponds to a detection sensor.

Figure 13:
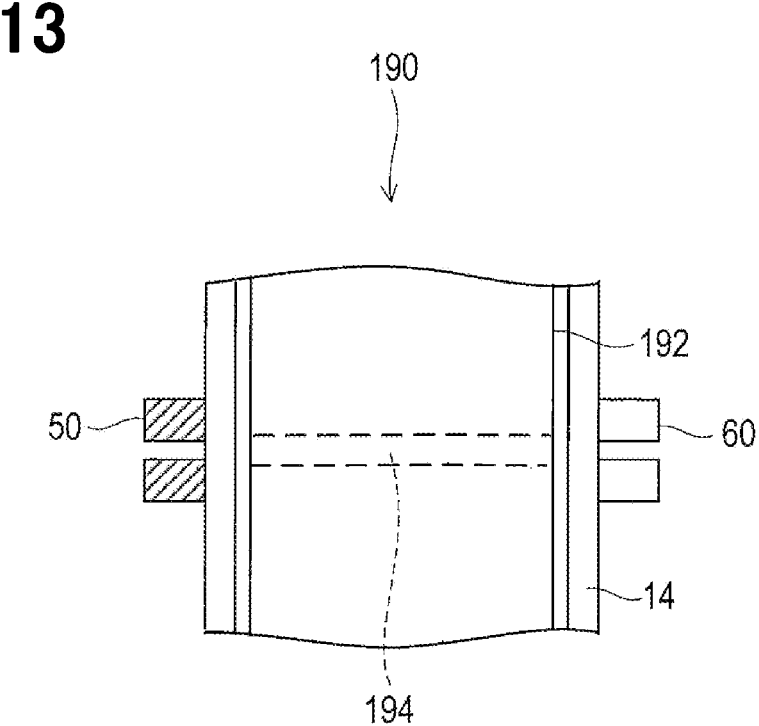
FIG. 13 is a schematic view showing the injector according to a tenth embodiment.

Tenth Embodiment, FIG. 13, Through Hole 195

In an injector 190 of the tenth embodiment shown in FIG. 13, the application coil 50 is installed on the outer circumference on one side of the cylinder portion 14 in the radial direction, as in the seventh embodiment described above, and the detection coil 60 is installed on the outer circumference on the other side of the above in the radial direction. Then, a through hole 194 is formed at a position facing the application coil 50 and the detection coil 60, penetrating a needle 192 in the radial direction.

In the reciprocal movement direction of the needle 192, the magnetic permeability at a position where the cylinder portion 14 faces the through hole 194 in the radial direction is lower than the magnetic permeability at the other position where the cylinder portion 14 faces the needle 192 other than the through hole 194. When the through hole 194 moves to a position facing the detection coil 60 at valve closed timing and the detection voltage drops, the microcomputer 110 determines that the position of the needle 192 at valve closed timing in the reciprocal movement direction has changed by a predetermined amount.

In the tenth embodiment, the through hole 194 corresponds to a position indicator.

3. Eleventh Embodiment, FIG. 14, Two Sets of Detection Coils 60 and Application Coils 50

[3-1. Difference from First Embodiment]

Since the basic configuration of the eleventh embodiment is the same as that of the first embodiment, the differences are described below. The same reference numerals as in the first embodiment denote the same components, and reference is made to the preceding description regarding the same components.

In the first embodiment described above, the application coil 50 and the detection coil 60 are installed on the outer circumference of the cylinder portion 14 on one side in the radial direction with respect to the needle 22. On the other hand, in an injector 200 of the eleventh embodiment shown in FIG. 14, the installation positions where the two sets of the application coil 50 and the detection coil 60 facing the needle 22 on both sides in the radial direction on the outer circumference of the cylinder portion 14, i.e., the two sets of the application coil 50 and the detection coil 60 having the needle 22 interposed therebetween, are different from the first embodiment.

The two sets of the application coil 50 and the detection coil 60 are, with the needle 22 interposed therebetween, installed on the outer circumference of the cylinder portion 14

(i) on both sides of the cylinder portion 14 in the radial direction and (ii) at the same positions in the reciprocal movement direction of the needle 22.

Each of the two detection circuits 100 applies an application voltage of a different frequency to the respective application coils 50. Therefore, the application coils 50 apply an alternating magnetic field having respectively different frequencies to the cylinder portion 14 and the needle 22. The two detection circuits 100 respectively perform lock-in detection based on the detection signals output by the two detection coils 60 and the reference signals having the same frequencies as the application voltages applied to the application coils 50.

Figure 14:
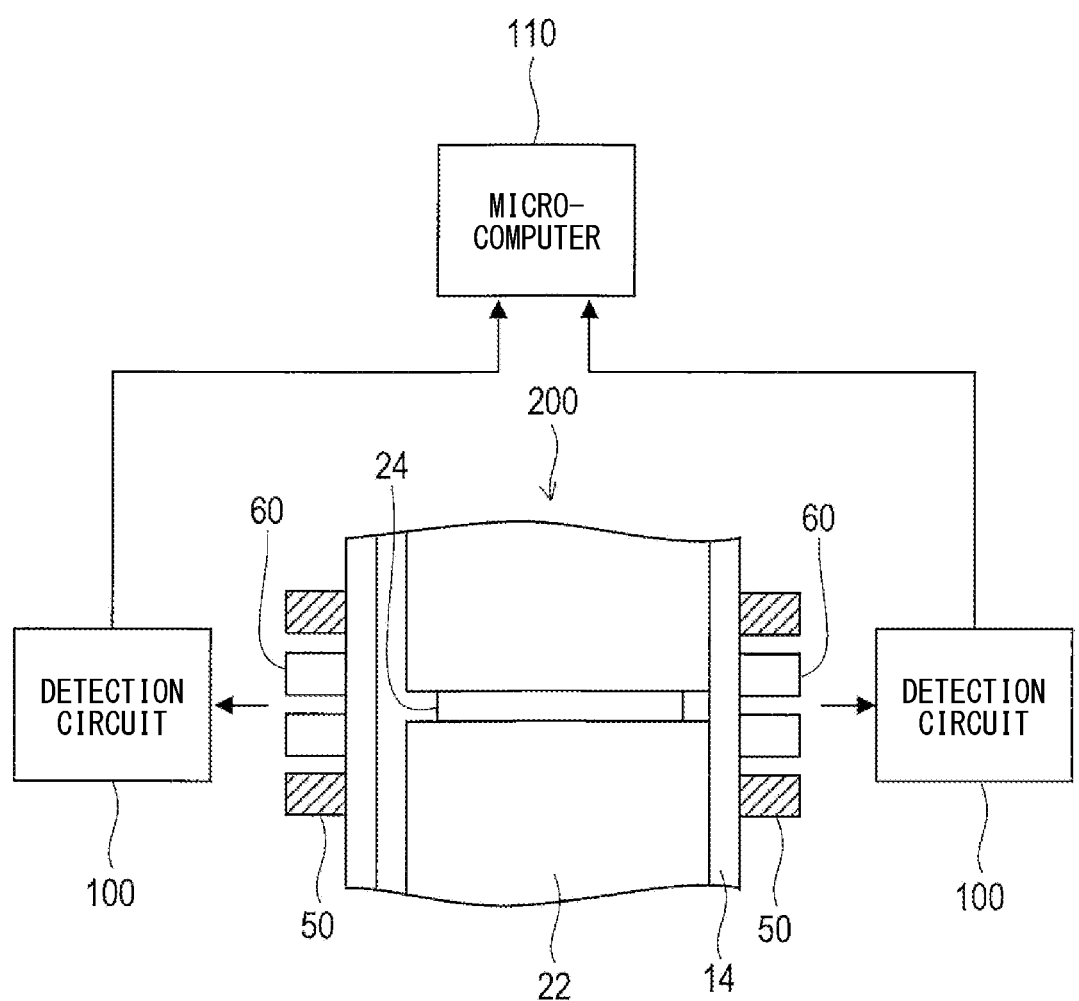
FIG. 14 is a schematic view showing the injector according to an eleventh embodiment.

As shown in FIG. 14, when the radial position of the needle 22 in the cylinder portion 14 is displaced, a gap between the inner circumferential surface of the cylinder portion 14 and the outer circumferential surface of the needle 22 on one side in the radial direction of the cylinder portion 14 is different from the same on the other side in the radial direction of the cylinder portion 14. As a result, the detection voltage detected from the detection signal output by the detection coil 60 installed on one side of the cylinder portion 14 in the radial direction with respect to the needle 22 increases. On the other hand, the detection voltage detected from the detection signal output by the detection coil 60 installed on the other side of the cylinder portion 14 in the radial direction decreases.

When the radial position of the needle 22 is not displaced in the radial direction and the position in the reciprocal movement direction of the needle 22 changes at valve closed timing, the detection voltage detected from the detection signals output from the detection coils 60 on both sides in the radial direction either increases or decreases in the same manner.

[3-2. Effects]

According to the eleventh embodiment described above, in addition to the effects (1a) to (1c) of the first embodiment described above, the following effects are further obtainable.

(3a) When one of the detection voltages detected from the induced voltage output from the detection coils 60 installed on both sides in the radial direction increases and the other decreases, it is determinable that, instead of the change of the position of the needle 22 at valve closed timing in the reciprocal movement direction, the position of the needle 22 in the radial direction has changed. As a result, it is possible to prevent erroneous detection at valve closed timing, in which the radial position change of the needle 22 is misdetected as the change of the position of the needle 22 in the reciprocal movement direction.

4. Twelfth Embodiment, FIG. 15, Vertical Offset

[4-1. Differences from the Eleventh Embodiment]

Since the basic configuration of the twelfth embodiment is the same as that of the eleventh embodiment, the differences therebetween are described in the following. The same reference numerals as those of the eleventh embodiment indicate the same configuration, and the preceding description is referred to for the same configuration.

In the injector 200 of the eleventh embodiment described above (in FIG. 14), two sets of the application coil 50 and the detection coil 60 are installed on both sides of the slit 24 at the same position in the reciprocal movement direction of the needle 22 with respect to the slit 24 on the outer circumference of the cylinder portion 14.

Figure 15:
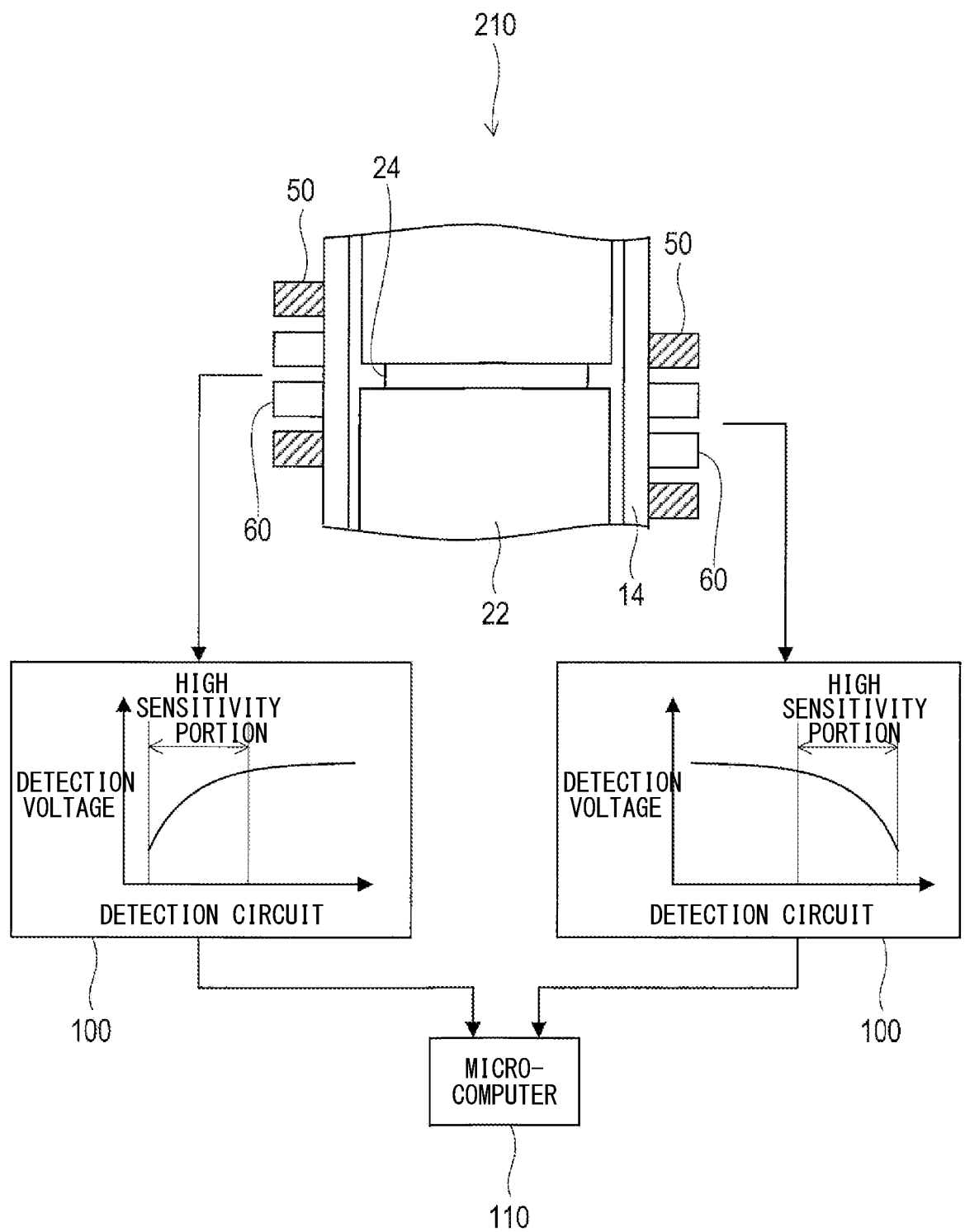
FIG. 15 is a schematic view showing the injector according to a twelfth embodiment.

On the other hand, in an injector 210 of the twelfth embodiment shown in FIG. 15, two sets of application coils 50 and the detection coil 60 are provided on opposite sides of the cylinder portion 14 and at different vertical positions in on the outer circumference of the cylinder portion 14. In such respect, the twelfth embodiment differs from the eleventh embodiment.

In the detection coil 60 that detects the step from the small radius side to the large radius side of the slit 24, the detection sensitivity is high in the first half in which the detection voltage increases (as shown by the left graph in FIG. 15). On the other hand, in the detection coil 60 that detects the step from the large radius side to the small radius side of the slit 24, the detection sensitivity is high in the latter half when the detection voltage drops (as shown by the right graph in FIG. 15).

The microcomputer 110 detects the position of the needle 22 in the reciprocal movement direction by combining portions of the detection voltage having high detection sensitivity for each of the two detection coils 60.

[4-2. Effect]

According to the twelfth embodiment described above, in addition to the effects (1a) to (1c) of the first embodiment described above, the following effects are further obtainable.

(4a) With respect to the detection voltage detected from the two detection coils 60, the amount of change of the position of the needle 22 at valve closed timing in the reciprocal movement direction is detectable with high accuracy by combining the portions having high detection sensitivity.

5. Thirteenth Embodiment, FIG. 13, Two Slits, Different Frequencies

[5-1. Difference from First Embodiment]

Since a basic configuration of the thirteenth embodiment is the same as that of the first embodiment, only differences from the first embodiment are described below. The same reference numerals as in the first embodiment denote the same components, and reference is made to the preceding description regarding the same components.

In the first embodiment described above, the slit 24 is formed at one position in the axial direction of the needle 22, and the application coil 50 and the detection coil 60 are installed at positions facing the slit 24 in the radial direction.

Figure 16:
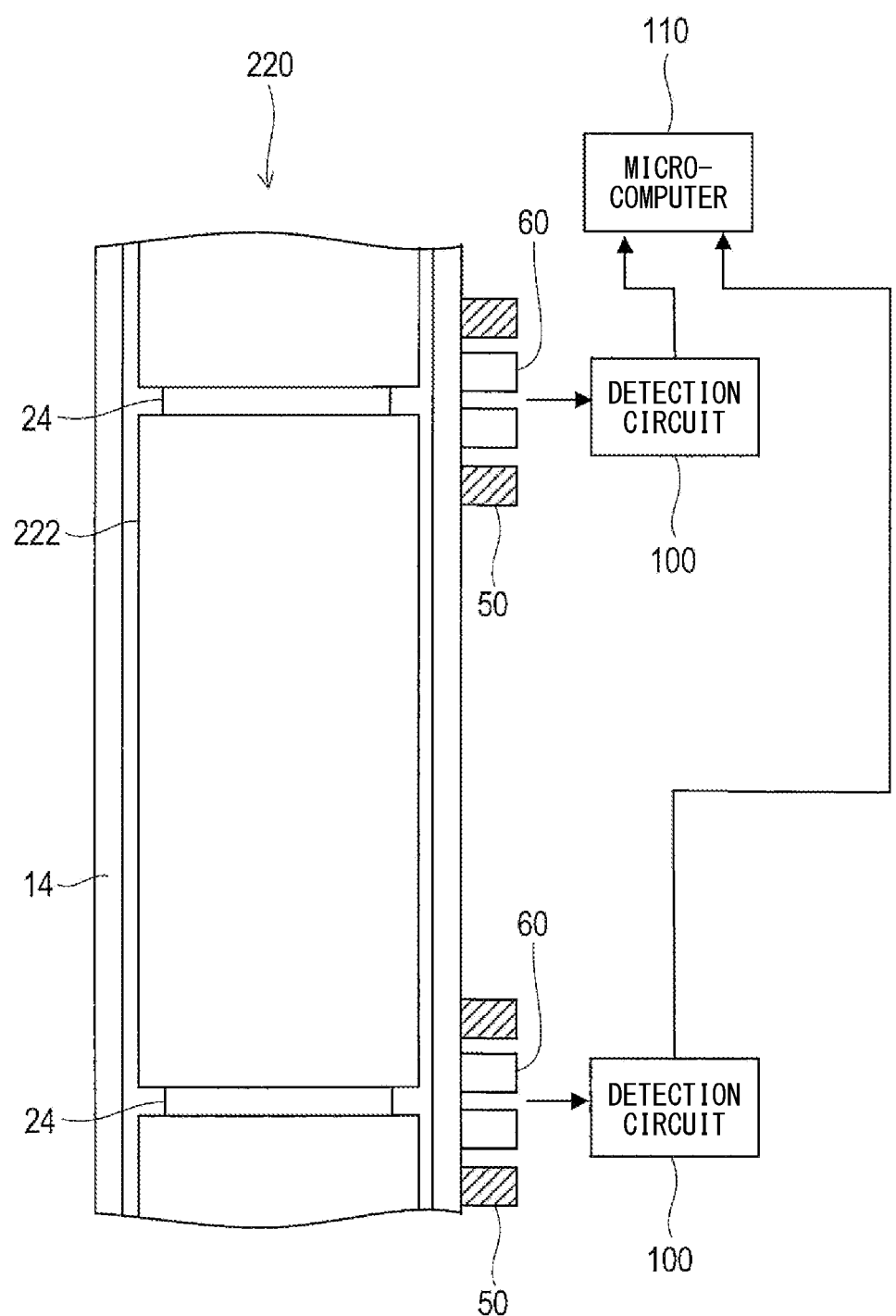
FIG. 16 is a schematic view showing the injector according to a thirteenth embodiment.

On the other hand, in an injector 220 of the thirteenth embodiment shown in FIG. 16, slits 24 are formed at two different positions of a needle 222 along the axial direction.

Further, two sets of the application coil 50 and the detection coil 60 are installed at two different positions facing the two slits 24 in the radial direction, that is, at two positions different in the reciprocal movement direction of the needle 222, which is a difference from the first embodiment.

In the thirteenth embodiment, each of the two detection circuits 100 applies an application voltage of a different frequency to the respective application coils 50. Therefore, the application coil 50 applies an alternating magnetic field having a different frequency to the cylinder portion 14 and the needle 222 in the respective sets. The two detection circuits 100 respectively perform lock-in detection based on the detection signals output by the two detection coils 60 and the reference signals having the same frequencies as the application voltages applied to the application coils 50.

The injector 220 of the thirteenth embodiment is, for example, an injector for direct injection into a cylinder. In the in-cylinder direct injection injector 220, the needle 222 expands due to the heat generated by the combustion of fuel. As a result, in terms of the amount of change of the position, the amount of change in the reciprocal movement direction is larger in the slit 24 far on the needle 222 from the combustion chamber than in the slit 24 near on the needle 222 from the combustion chamber.

The microcomputer 110 detects the amount of expansion in the reciprocal movement direction for each of the two slits 24 on the needle 222 which are formed at the two positions based on the difference in the amount of change of the positions of the slits 24 in the reciprocal movement direction, which are disposed at the two separate positions from each other in the axial direction of the needle 222.

Then, the microcomputer 110 detects an actual amount of change of the position of the needle 222 at valve closed timing in the reciprocal movement direction, by removing (i.e., subtracting) the expansion amount in the reciprocal movement direction from the amount of change of the position in the reciprocal movement direction of/regarding the slits 24 formed at two positions in the axial direction of the needle 222.

[5-2. Effects]

According to the thirteenth embodiment described above, in addition to the effects (1a) to (1c) of the first embodiment described above, the following effects are further obtainable.

(5a) Since the slits 24 are formed at two positions separated in the axial direction (vertical direction), the actual amount of change of the position of the needle 222 at valve closed timing in the reciprocal movement direction is detectable in consideration of the expansion of the needle 222 due to heat.

6. Fourteenth Embodiment, FIG. 17, Wide Slit, Two Edges

[6-1. Difference from First Embodiment]

Since the basic configuration of the fourteenth embodiment is the same as that of the first embodiment, the differences are described in the following. The same reference numerals as in the first embodiment denote the same components, and reference is made to the preceding description regarding the same components.

Figure 17:
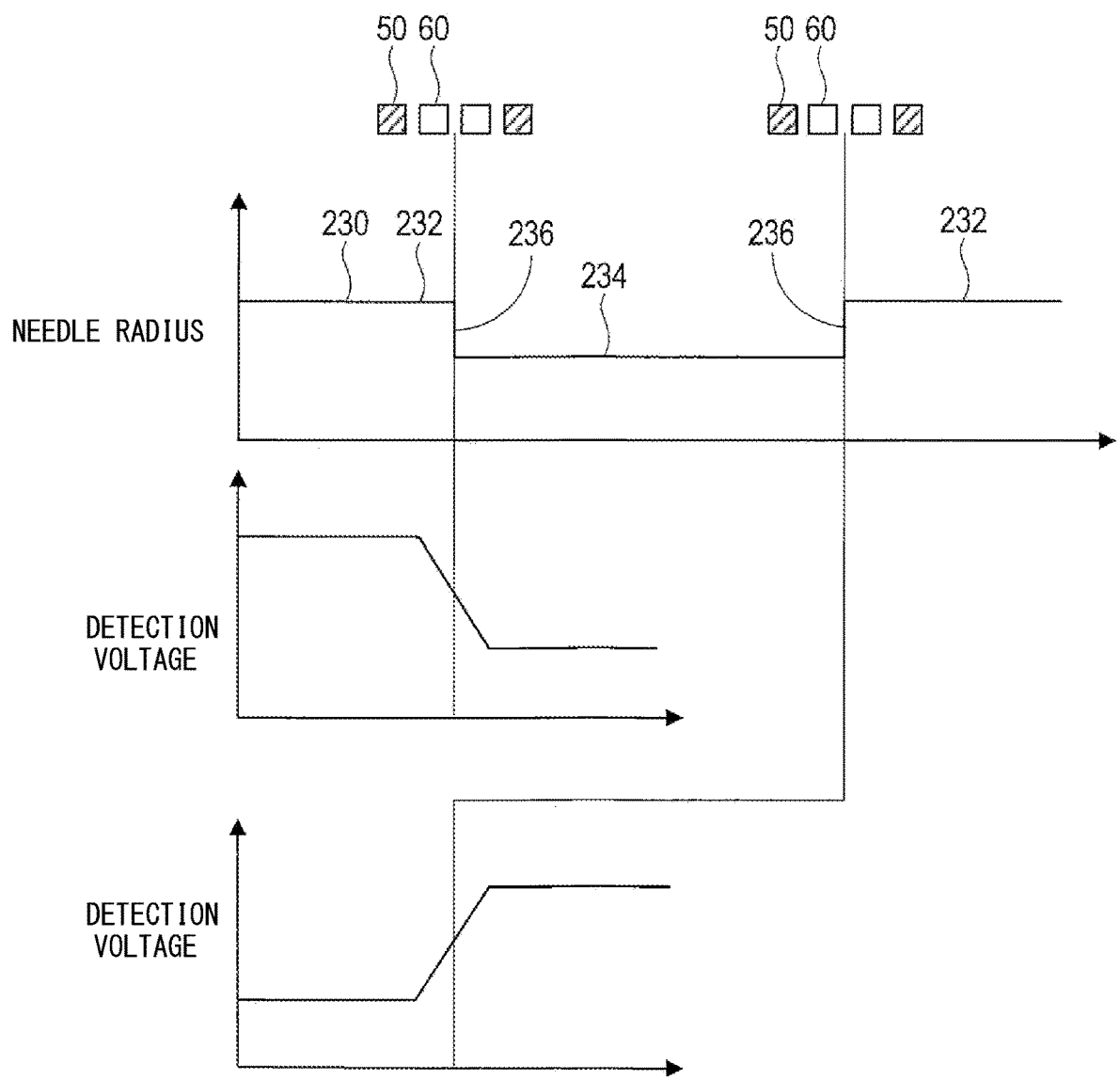
FIG. 17 is a schematic view showing the injector of a fourteenth embodiment.

In the first embodiment described above, the application coil 50 and the detection coil 60 are installed at positions radially facing the slit 24 that is formed at one position in the axial direction of the needle 22. On the other hand, as shown in FIG. 17, in the fourteenth embodiment, a needle 230 has a small radius portion 234 formed at a positon between two large radius portions 232. Further, each of two steps 236 formed at a boundary between the large radius portion 232 and the small radius portion 234 has one set of application coil 50 and the detection coil 60 facing in the radial direction, which means each of the positions separated in the reciprocal movement direction of the needle 230 has one set of coils 50 and 60, which is a difference from the first embodiment.

That is, in the fourteenth embodiment, two sets of the application coil 50 and the detection coil 60 are installed at positions separated from each other in the reciprocal movement direction of the needle 230. The axial length of the needle 230 of the small radius portion 234 is longer than the axial length of the slit 24 of the first embodiment so that one set of the application coil 50 and the detection coil 60 can be correspondingly installed for each of the two steps 236.

The two sets of the application coil 50 and the detection coil 60 are installed, i.e., positioned, for enabling the microcomputer 110 to simultaneously detect the change of the detection voltage corresponding to the step 236 from the detection signals of the two detection coils 60.

More specifically, when the detection voltage detected from one detection coil 60 increases and the detection voltage detected from the other detection coil 60 decreases, the microcomputer 110 determines that the position of the needle 230 at valve closed timing in the reciprocal movement direction has moved by a predetermined amount.

That is, when the magnitude of the detection voltage respectively detected from the two detection coils 60 changes in the opposite directions of the rise and fall (i.e., increase and decrease), the microcomputer 110 determines that the position of the needle 230 at valve closed timing in the reciprocal movement direction has moved by a predetermined amount.

However, there may be a case in which a change in the detection voltage corresponding to the step 236 is detected from one of the detection coils 60 installed at two locations, but is not detected from the other detection coil 60.

In such case, since it is considered that noise or the like is mixed in one of the detection voltages of the two detection coils 60, the microcomputer 110 does not determine that the position of the needle 230 at valve closed timing in the reciprocal movement direction has moved by a predetermined amount.

[6-2. Effects]

According to the fourteenth embodiment described above, in addition to the effects (1a) to (1c) of the first embodiment described above, the following effects are further obtainable.

(6a) When the change in the detection voltage corresponding to the step 236 is not detected from both of the detection coils 60 installed at two positions separated in the reciprocal movement direction of the needle 230, the injection control device is prevented from mis-determining such a situation that the position of the needle 230 at valve closed timing in the reciprocal movement direction has moved by a predetermined amount.

7. Fifteenth Embodiment

[7-1. Difference from First Embodiment]

Since the basic configuration of the fifteenth embodiment is the same as that of the first embodiment, the differences are described in the following. The same reference numerals as in the first embodiment denote the same components, and reference is made to the preceding description regarding the same components.

In the first embodiment described above, in order to detect the amount of change of the position of the needle 22 at valve closed timing in the reciprocal movement direction, the application coil 50 for applying a magnetic field that applies a magnetic field to the cylinder portion 14 and the needle 22 is installed to the outer circumference of the cylinder portion 14.

Figure 18:
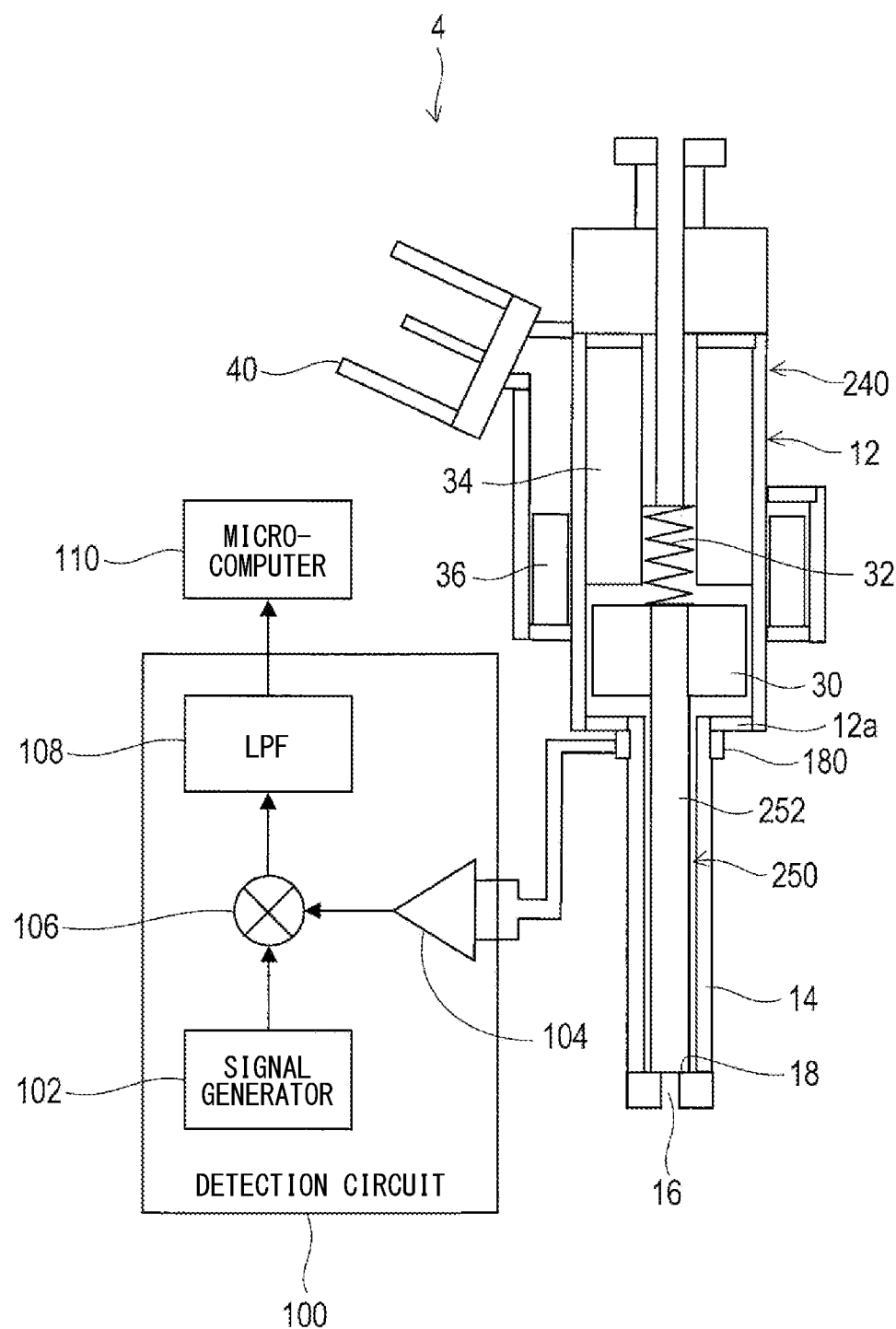
FIG. 18 is a configuration diagram showing an injection control device according to a fifteenth embodiment.

On the other hand, in an injector 240 of an injection control device 4 of the fifteenth embodiment shown in FIG. 18, the drive coil 36 also serves as an application coil for applying a magnetic field to the movable core 30 and a step portion 12a of the valve housing 12, which is a difference from the first embodiment.

The detection coil 180 is wound around the outer circumference of the cylinder portion 14 near the step portion 12a. When the position of a needle 252 of a movable part 250 in the reciprocal movement direction at valve closed timing moves toward the seat portion 18, the distance between the movable core 30 and the step portion 12a at valve closed timing becomes smaller. As a result, the magnetic permeability between the movable core 30 and the step portion 12a at valve closed timing increases, thereby the detection voltage detected from the detection signal of the detection coil 180 increases.

When the detection voltage rises by a predetermined voltage or more, the microcomputer 110 determines that the position of the needle 230 at valve closed timing in the reciprocal movement direction has moved by a predetermined amount.

[7-2. Effects]

According to the fifteenth embodiment described above, in addition to the effects (1a) to (1c) of the first embodiment described above, the following effects are further obtainable.

(7a) Since the drive coil 36 also serves as the application coil, the number of parts of the injection control device 4 is reducible.

8. Sixteenth Embodiment

[8-1. Difference from First Embodiment]

Since the basic configuration of the sixteenth embodiment is the same as that of the first embodiment, the differences are described in the following. The same reference numerals as in the first embodiment denote the same components, and reference is made to the preceding description regarding the same components.

In the first embodiment described above, the slit 24 is formed at one position in the axial direction of the needle 22, and the application coil 50 and the detection coil 60 are installed at positions facing the slit 24 in the radial direction.

Figure 19:
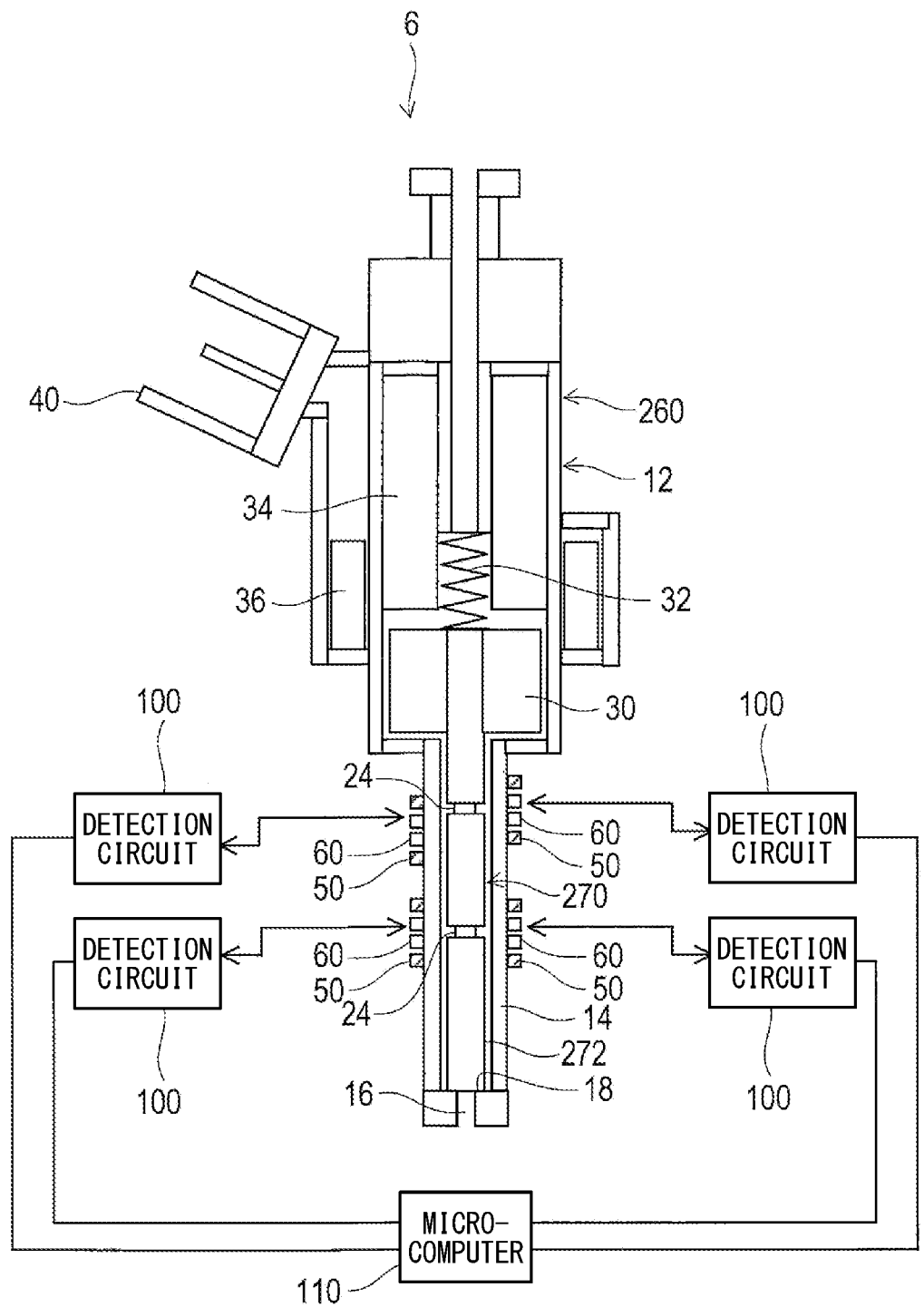
FIG. 19 is a configuration diagram showing the injection control device according to a sixteenth embodiment.

On the other hand, in an injector 260 of an injection control device 6 of the sixteenth embodiment shown in FIG. 19, slits 24 are formed at two positions different in the axial direction with respect to a needle 272 of a movable part 270, which is a difference from the first embodiment.

Further, in the sixteenth embodiment, for one of the slits 24 formed at two positions in the axial direction of the needle 272, the application coil 50 and the detection coil 60 are installed correspondingly on the outer circumference of the cylinder portion 14 at the same position on both sides in the radial direction and in the reciprocal movement direction of the needle 272. In such respect, the sixteenth embodiment is different from the first embodiment.

Further, in the sixteenth embodiment, for the other one of the slits 24 formed at two positions in the axial direction of the needle 272, the application coil 50 and the detection coil 60 are installed correspondingly on the outer circumference of the cylinder portion 14 at different positions on both sides in the radial direction and in the reciprocal movement direction of the needle 272. In such respect, the sixteenth embodiment is different from the first embodiment.

In the injector 260 of the sixteenth embodiment, the application coil 50 and the detection coil 60 are provided, or installed, by four sets, that is, more than two sets of them. Then, in the injector 260 of the sixteenth embodiment, a configuration that combines the configurations of the eleventh embodiment to the thirteenth embodiment described above is adopted.

(8-2. Effects)

According to the sixteenth embodiment described above, it is possible to obtain an effect in which the effects of the eleventh to thirteenth embodiments described above are combined.

4. Other Embodiments

Although the embodiments of the present disclosure have been described above, the present disclosure is not limited to the above-described embodiments, and can be implemented in various modifications.

(9a) In the above-described embodiments, an injector for injecting gaseous fuel has been described as an example, but the present disclosure is not limited to such an example. For example, it may be an injector that injects liquid fuel.

(9b) In the above-described embodiments, the detection coil is used as a magnetic sensor, but the present disclosure is not limited to such an example. For example, a Hall element or a SQUID sensor may be used as a magnetic sensor. SQUID is an abbreviation for Superconducting Quantum Interference Device.

(9c) The injection control device and method thereof described in the present disclosure may be realized by a dedicated computer that is provided by configuring a processor and memory programmed to perform one or more functions embodied by a computer program. Alternatively, the injection control device and method thereof described in the present disclosure may be realized by a dedicated computer provided by configuring the processor with one or more dedicated hardware logic circuits. Alternatively, the injection control device and method thereof described in the present disclosure may be realized by one or more dedicated computers configured as a combination of (i) a processor and memory programmed to perform one or more functions and (ii) a processor composed of one or more hardware logic circuits. Further, the computer program may be stored in a computer-readable, non-transitory tangible storage medium as instructions to be performed by a computer. The method for realizing the functions of each part included in the injection control device does not necessarily include software, and all the functions may be realized by using one or more hardware devices.

(9d) A plurality of functions possessed by one component in the above-described embodiment may be realized by a plurality of components, or one function possessed by one component may be realized by a plurality of components. Further, a plurality of functions possessed by a plurality of components may be realized by one component, or one function realized by a plurality of components may be realized by one component. Further, a part of the configuration of the above-described embodiment may be omitted. In addition, at least a part of the configuration of the above-described embodiment may be added or replaced with the configuration of another above-mentioned embodiment.

(9e) In addition to the injection control device described above, the present disclosure can also be realized in various forms such as a system having the injection control device as a component, a program for operating a computer as the injection control device, a non-transitory, substantive recording medium such as a semiconductor memory or the like in which the above program is recorded, an injection control method and the like.

What is claimed is:

1. An injection control device comprising:
   an injector including:
      an injection hole;
      a movable part opening and closing the injection hole by reciprocal movement;
      a seat portion having the injection hole, wherein the injection hole is closed when the movable part is seated and the injection hole is open when the movable part is lifted;
      a valve housing accommodating the movable part in a reciprocally movable manner; and
      a magnetic field application unit installed on an outer circumference of the valve housing and applying an AC (alternating current) magnetic field to the movable part and the valve housing;
   a detection sensor outputting, as a detection signal, an induced electromotive force having a same frequency as the AC magnetic field applied by the magnetic field application unit and generated according to a size of a distance, which is a magnetic gap, between the valve housing and the movable part by the AC magnetic field applied by the magnetic field application unit,
   a detection unit detecting a position of the movable part in a reciprocal movement direction based on the detection signal output by the detection sensor when the movable part closes the injection hole; and
   a control device configured to receive the position of the movable part in the reciprocal movement direction detected by the detection unit,
   wherein
   the detection unit performs lock-in detection by the detection signal and a reference signal having the same frequency as the AC magnetic field applied by the magnetic field application unit.

2. The injection control device of claim 1, wherein
   the movable part includes a needle that opens and closes the injection hole, and a movable core that reciprocates integrally with the needle, and
   the detection unit is configured to determine that a contact part between the needle and the seat portion is worn by detecting the position of the movable part at valve closed timing in the reciprocal movement direction.

3. The injection control device of claim 2, wherein
   the magnetic field application unit applies the AC magnetic field to the movable part and the valve housing by an application coil for applying the AC magnetic field, the application coil being different from a drive coil that drives the movable part in the reciprocal movement direction, and
   the needle has a position indicator at which a distance from the valve housing in a radial direction is different from other positions of the needle in the axial direction.

4. The injection control device of claim 3, wherein
   the application coil and the detection coil are wound around the outer circumference of the valve housing.

5. The injection control device of claim 1, wherein
   the detection sensor is a detection coil.

6. The injection control device of claim 1, wherein the magnetic field application unit and the detection sensor are coaxially installed on the outer circumference of the valve housing.

7. The injection control device of claim 1, wherein two or more sets of the magnetic field application unit and the detection sensor are installed.

8. The injection control device of claim 7, wherein the two sets of the magnetic field application unit and the detection sensor are installed at positions facing each other across the movable part on the outer circumference of the valve housing.

9. The injection control device of claim 7, wherein when the position of the movable part at valve closed timing in the reciprocal movement direction changes, a magnitude of the detection signals output by the two detection sensors changes in opposite directions of rising and falling.

10. The injection control device of claim 1, wherein the magnetic field application unit applies the AC magnetic field to the movable part and the valve housing by a drive coil that drives the movable part in the reciprocal movement direction.

11. The injection control device according to claim 1, wherein
the detection unit is further configured to control fuel injection of the injector, and
the detection unit is configured to adjust an injection control process for the injector when the position of the movable part at valve closed timing in the reciprocal movement direction changes.

12. The injection control device of claim 11, wherein the detection unit is configured to adjust an injection start timing of the injector when the position of the movable unit at valve closed timing in the reciprocal movement direction changes.

13. The injection control device of claim 11, wherein the detection unit is configured to adjust the injection period of the injector when the position of the movable unit at valve closed timing in the reciprocal movement direction changes.

14. The injection control device of claim 11, wherein the detection unit is configured to adjust a pressure of fuel supplied to the injector when the position of the movable unit at valve closed timing in the reciprocal movement direction changes.

15. The injection control device of claim 1, wherein the detection unit is configured to prompt replacement of the injector when the position of the movable unit at valve closed timing in the reciprocal movement direction changes.

16. The injection control device of claim 1, wherein the movable part includes a needle including a position indicator, wherein the position indicator has low magnetic permeability relative to another region of the needle;
the magnetic field application unit includes an application coil configured to apply the AC magnetic field; and
the detection sensor is a detection coil configured to generate an induced voltage that is influenced by an interaction of the position indicator and the applied AC magnetic field.

17. The injection control device of claim 16, wherein the position indicator is a circumferential U-shaped slit in an outer surface of the needle.

18. The injection control device of claim 16, wherein the needle includes:
(i) a large radius portion,
(ii) a small radius portion, and
(iii) a step at a boundary between the small radius portion and the large radius portion, and
wherein the position indicator is the small radius portion.

19. The injection control device of claim 16, wherein the needle includes:
(i) a large radius portion,
(ii) a tapered portion, and
(iii) a small radius portion, and
wherein the position indictor includes both the tapered portion and the small radius portion.

20. The injection control device of claim 16, wherein the position indicator is a circumferential V-shaped slit in an outer surface of the needle.

21. The injection control device of claim 16, wherein the needle includes:
(i) an upper large radius portion,
(ii) a lower large radius portion,
(iii) a small radius portion located between the large radius portions, and
(iv) a circumferential outward protrusion protruding radially outwardly from the small radius portion.

22. The injection control device of claim 21, wherein the valve housing includes:
an outer cylinder;
an upper inner cylinder located substantially between the upper large radius portion and the outer cylinder when the injection control device is closed;
a lower inner cylinder located substantially between the lower large radius portion and the outer cylinder when the injection control device is closed, wherein the lower inner cylinder is separated in a vertically downward direction from the upper inner cylinder; and
a circumferential inward protrusion protruding radially inwardly from the outer cylinder in a location between the upper inner cylinder and the lower inner cylinder.

23. The injection control device of claim 16, wherein the valve housing includes a cylinder portion surrounding the needle,
wherein the application coil is located on a first side of the cylinder portion, and
wherein the detection coil is located on an opposite side of the cylinder portion, relative to the application coil.

24. The injection control device of claim 16, wherein the valve housing includes a cylinder portion surrounding the needle,
wherein the detection coil is located at an first location on the cylinder portion, and
wherein the application coil is located at a second location on the cylinder portion that is vertically offset from the first location on the cylinder portion, and
wherein both coils are located on a first side of the cylinder portion, and are not located on an opposite side of the cylinder portion.

25. The injection control device of claim 16, wherein the valve housing includes a cylinder portion surrounding the needle,
wherein the detection coil circumferentially surrounds the cylinder portion at a first location on the cylinder portion,
wherein the application coil circumferentially surrounds the cylinder portion at a second location on the cylinder portion that is vertically offset from the first location on the cylinder portion.

26. The injection control device of claim 16, wherein the position detector includes a through hole oriented horizontally through the needle.

27. The injection control device of claim 16, further comprising:
an auxiliary application coil; and
an auxiliary detection coil,
wherein the valve housing includes a cylinder portion,
wherein the application coil and the detection coil are located at a first side of the cylinder portion and are configured to communicate with a detection circuit, and
wherein the auxiliary application coil and the auxiliary detection coil are located at an opposite side of the cylinder portion and are configured to communicate with an auxiliary detection circuit.

28. The injection control device of claim 16, further comprising:
an auxiliary application coil; and
an auxiliary detection coil,
wherein the valve housing includes a cylinder portion,
wherein the application coil and the detection coil are located at a first side of the cylinder portion,
wherein the auxiliary application coil and the auxiliary detection coil are located at an opposite side of the cylinder portion,
wherein the auxiliary application coil is offset vertically in a first direction relative to the application coil, and
wherein the auxiliary detection coil is offset vertically in the first direction relative to the detection coil.

29. The injection control device of claim 1, wherein the magnetic field application unit is an application coil, the detection sensor is a detection coil, and the application coil and the detection coil are coaxially installed on an outer circumference of a cylinder portion of the valve housing.

30. An injection control device comprising:
an injector including:
an injection hole;
a movable part opening and closing the injection hole by reciprocal movement;
a seat portion having the injection hole, wherein the injection hole is closed when the movable part is seated and the injection hole is open when the movable part is lifted;
a valve housing accommodating the movable part in a reciprocally movable manner;
a magnetic field application unit installed on an outer circumference of the valve housing and applying a magnetic field to the movable part and the valve housing; and
a detection sensor outputting a detection signal according to a size of a distance between the valve housing and the movable part by the magnetic field applied by the magnetic field application unit;
a detection unit detecting a position of the movable part in a reciprocal movement direction based on the detection signal output by the detection sensor when the movable part closes the injection hole; and
a control device configured to receive the position of the movable part in the reciprocal movement direction detected by the detection unit,
wherein
two or more sets of the magnetic field application unit and the detection sensor are installed,
the magnetic field application unit of each set applies an alternating magnetic field of different frequencies to the movable unit and the valve housing, and
the detection unit performs lock-in detection by the detection signal output by the detection sensor of each set and the reference signal having the same frequency as the AC magnetic field applied by the magnetic field application unit of each set.

31. An injection control device comprising:
an injector including:
an injection hole;
a movable part opening and closing the injection hole by reciprocal movement;
a seat portion having the injection hole, wherein the injection hole is closed when the movable part is seated and the injection hole is open when the movable part is lifted;
a valve housing accommodating the movable part in a reciprocally movable manner;
a magnetic field application unit installed on an outer circumference of the valve housing and applying a magnetic field to the movable part and the valve housing; and
a detection sensor outputting a detection signal according to a size of a distance between the valve housing and the movable part by the magnetic field applied by the magnetic field application unit;
a detection unit detecting a position of the movable part in a reciprocal movement direction based on the detection signal output by the detection sensor when the movable part closes the injection hole; and
a control device configured to receive the position of the movable part in the reciprocal movement direction detected by the detection unit,
wherein
two or more sets of the magnetic field application unit and the detection sensor are installed, and
the two sets of the magnetic field application unit and the detection sensor are installed at different positions in the reciprocal movement direction on the outer circumference of the valve housing.

* * * * *